(12) United States Patent
Basler

(10) Patent No.: US 7,076,642 B2
(45) Date of Patent: Jul. 11, 2006

(54) INTEGRATED CIRCUIT HAVING A GENERIC COMMUNICATION INTERFACE

(75) Inventor: Stefan Basler, Villingen-Schwenningen (DE)

(73) Assignee: Thomson Licensing, Boulogne (FR)

( * ) Notice: Subject to any disclaimer, the term of this patent is extended or adjusted under 35 U.S.C. 154(b) by 738 days.

(21) Appl. No.: 10/202,291

(22) Filed: Jul. 24, 2002

(65) Prior Publication Data

US 2003/0046446 A1 Mar. 6, 2003

(30) Foreign Application Priority Data

Jul. 24, 2001 (EP) .................................. 01117898

(51) Int. Cl.
*G06F 15/16* (2006.01)
(52) U.S. Cl. .............................. 713/1; 713/2; 709/220; 709/223; 709/228; 709/237; 370/465; 370/466; 370/467; 370/469
(58) Field of Classification Search ................ 713/1, 713/2; 709/220, 223, 228, 237; 370/465–467, 370/469
See application file for complete search history.

(56) References Cited

U.S. PATENT DOCUMENTS

| | | | | | |
|---|---|---|---|---|---|
| 4,490,788 | A | * | 12/1984 | Rasmussen | ................... 710/21 |
| 5,109,499 | A | * | 4/1992 | Inagami et al. | .............. 711/147 |
| 5,822,553 | A | | 10/1998 | Gifford et al. | ............... 395/309 |
| 6,182,242 | B1 | * | 1/2001 | Brogan et al. | ................. 714/26 |
| 6,230,195 | B1 | * | 5/2001 | Sugawara et al. | ........... 709/220 |
| 6,349,331 | B1 | * | 2/2002 | Andra et al. | ................. 709/220 |
| 6,426,959 | B1 | * | 7/2002 | Jacobson et al. | ............ 370/468 |
| 6,463,552 | B1 | * | 10/2002 | Jibbe | ............................ 714/33 |
| 6,523,696 | B1 | * | 2/2003 | Saito et al. | .................. 709/223 |
| 6,687,857 | B1 | * | 2/2004 | Iwata et al. | .................... 714/38 |
| 6,721,615 | B1 | * | 4/2004 | Fava et al. | ..................... 700/99 |
| 6,763,472 | B1 | * | 7/2004 | Warwick et al. | ............ 713/320 |
| 6,813,599 | B1 | * | 11/2004 | Court et al. | ................... 703/14 |
| 6,842,660 | B1 | * | 1/2005 | Tripathi et al. | ............. 700/121 |
| 2002/0129353 | A1 | * | 9/2002 | Williams et al. | ............ 717/175 |
| 2002/0169883 | A1 | * | 11/2002 | Bright et al. | ................ 709/230 |
| 2002/0170951 | A1 | * | 11/2002 | Oshins et al. | ................ 235/375 |
| 2003/0055529 | A1 | * | 3/2003 | Aosawa | ....................... 700/220 |
| 2003/0083754 | A1 | * | 5/2003 | Tripathi et al. | ................. 700/2 |
| 2003/0164977 | A1 | * | 9/2003 | Aagesen | ..................... 358/1.15 |
| 2003/0200355 | A1 | * | 10/2003 | Warwick et al. | ............ 709/321 |
| 2003/0221118 | A1 | * | 11/2003 | Walker | ......................... 713/193 |
| 2004/0001504 | A1 | * | 1/2004 | Rostron et al. | .............. 370/463 |
| 2004/0213255 | A1 | * | 10/2004 | Brinkerhoff et al. | ...... 370/395.1 |

FOREIGN PATENT DOCUMENTS

WO 97/19402 5/1997

* cited by examiner

*Primary Examiner*—A. Elamin
(74) *Attorney, Agent, or Firm*—Joseph J. Laks; Robert P. Shedd; Brian J. Cromarty

(57) ABSTRACT

An integrated circuit having a generic communication interface, the integrated circuit comprising a primary processing unit and at least a first and a second communication interface for the primary processing unit for communicating in accordance with at least a first and a second communication protocol, characterized in that a set of registers of the communication interface are arranged such that a specific register functionality is accessible independently of a selection of the first or the second communication interface.

11 Claims, 2 Drawing Sheets

INTEGRATED CIRCUIT HAVING A GENERIC COMMUNICATION INTERFACE

This application claims the benefit, under 35 U.S.C. 119, of European patent application No. 01117898.5 filed Jul. 24, 2001.

FIELD OF THE INVENTION

The invention relates to the field of integrated circuits having a communication interface, such as micro controllers and/or systems on chip which need to communicate with a variety of peripheral devices.

BACKGROUND OF THE INVENTION

A variety of integrated circuit systems is known from the prior art which comprise more than one processing unit. Information is exchanged between the processing units via transmission channels while the communication interface is realized by means of communication modules and physical connections. In an embedded micro controller environment where one processing unit has to exchange information with different peer processing units and/or communication peripherals the processing unit needs to support all of the communication protocols used by any peer and/or communication peripheral in terms of hardware and software.

The communication module hardware implements the physical link from the transmission channel to/from the processing unit. The boundary of the hardware portion of the module is formed by a register interface.

The communication module software is divided into a number of functional blocks. The processing unit peripherals need to be initialised in order to allow for communication at all. Initialisation is performed by the initialisation software portion of the communication module software. The driver software is the portion of the overall communication software which accesses the register interface of the communication module hardware and exchanges data between the communication interface and processing unit internal memory. The driver software is active after initialisation while data is communicated in an error free manner. Application software operates upon data held in the processing unit internal memory after reception and provides data to the processing unit internal memory for transmission. The error software of the communication module software acts on the occurrence of an error in data transmission while signalling such a condition to the application software and allowing the communication software to recover from error affected conditions.

Currently available processing units (e.g. legacy microcontroller devices, dedicated communication peripheral ICs, . . . ) implement for each communication module hardware which is specific to the communication interface in all respects. This approach demands for specific software for each communication channel on initialisation, driver, and error level. Consequently, the engineering effort for implementing and testing communication software as well as program memory requirement grows in a manner proportional to the number of communication interfaces supported. Aiming to reduce the engineering effort and program memory requirement demands for a new approach of communication module interface.

FIG. 1 shows a typical example of a prior art system. The system has communication interfaces I, II, . . . N (CI1, CI2, CIN). Each of the communication interfaces has its dedicated communication interface I, II, . . . N specific register interface (SRI1, SRI2, SRIN). Likewise, each of the communication interfaces I, II, . . . N has a dedicated driver software I, II, . . . N (SDS1, SDS2, SDSN) which communicates with the communication interface I, II, . . . N specific register interface (SRI1, SRI2, SRIN). The driver software (SDS1, SDS2, SDSN) for communication with a specific communication interface (CI1, CI2, CIN) is invoked by the application software (AS) which has a communication interface independent call routine for the required communication. The realization of specific register interfaces (SRI1, SRI2, SRIN) for each communication interface (CI1, CI2, CIN) and the programming of dedicated driver software (SDS1, SDS2, SDSN) is expensive both in terms of time and cost.

SUMMARY OF THE INVENTION

It is, therefore, an object of the present invention to provide an improved integrated circuit which alleviates the disadvantages of the prior art.

The present invention is based on a software friendly configuration of the communication module register interface. According to a preferred embodiment of the invention the communication interface separates communication interface specific register contents from those available in all communication interfaces.

For example, register contents common to all communication interfaces implement general status and control register functions as well as data registers. Arranging these register contents in such a manner that the same register functionality is accessible at the same location within a register and that all registers are placed in the same order, identical software data structures are applicable to any communication interface.

The present invention is advantageous in that all software within the driver software blocks operating on these data structures can be the same regardless of the communication interface operated upon. Only one driver software needs to be implemented which associates an abstract identifier and a data structure index with each communication module.

It is a particular advantage of the present invention that the driver software is implemented only once which reduces the engineering effort and also the program memory requirement. Also the effort and expense for testing is greatly reduced since the driver software needs to be tested only once.

According to a further preferred embodiment of the invention communication interface specific register contents realize functions for communication specific initialisation and error status. Only such specific functions would require specific software for some initialisation and error handling software functions. Those specific software functions are, however, very limited in size in comparison to multiple software drivers.

According to the invention, a method for communicating data between a primary processing unit and plurality of external peripherals via a plurality of communication interfaces with a plurality of communication protocols, a set of registers of each communication interface being arranged such that a specific register functionality is accessible independently of a selection of the first or the second communication interface, comprises the steps of associating each communication interface with an abstract identifier and a data structure index, determining with which external peripheral data is to be exchanged, identifying the respective communication interface, initialising the determined external peripheral via communication interface specific registers of the identified communication interface, exchanging data and general status and control information with the determined external peripheral via the communication interface independent set of registers of the identified communication interface, and controlling an error status of the determined external peripheral via communication interface specific registers of the identified communication interface.

BRIEF DESCRIPTION OF THE DRAWINGS

In the following the invention will be described in more detail with reference to the drawings in which.

DETAILED DESCRIPTION OF PREFERED EMBODIMENTS

Figure 1:
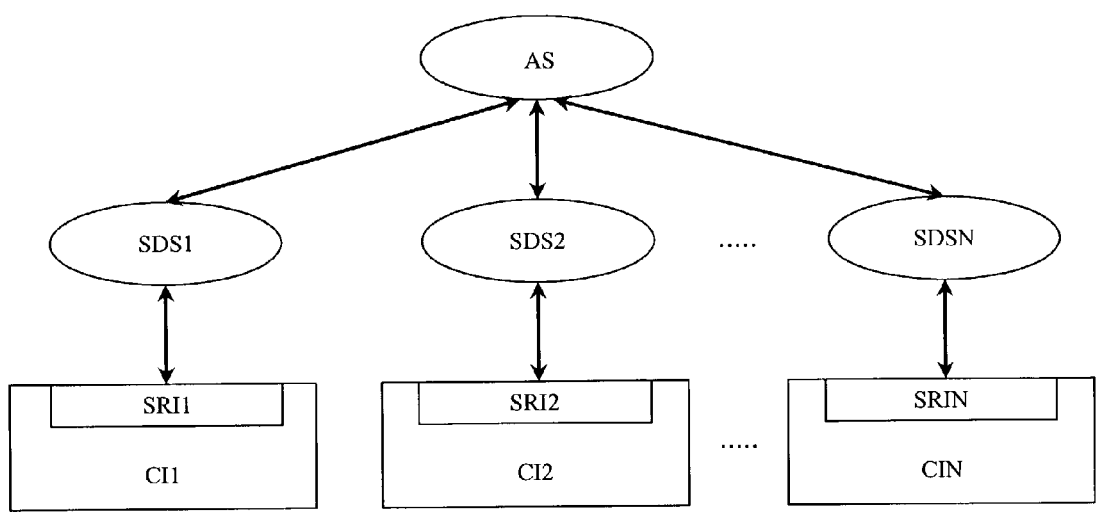
FIG. 1 is a schematic diagram of a prior art integrated circuit system.
Figure 2:
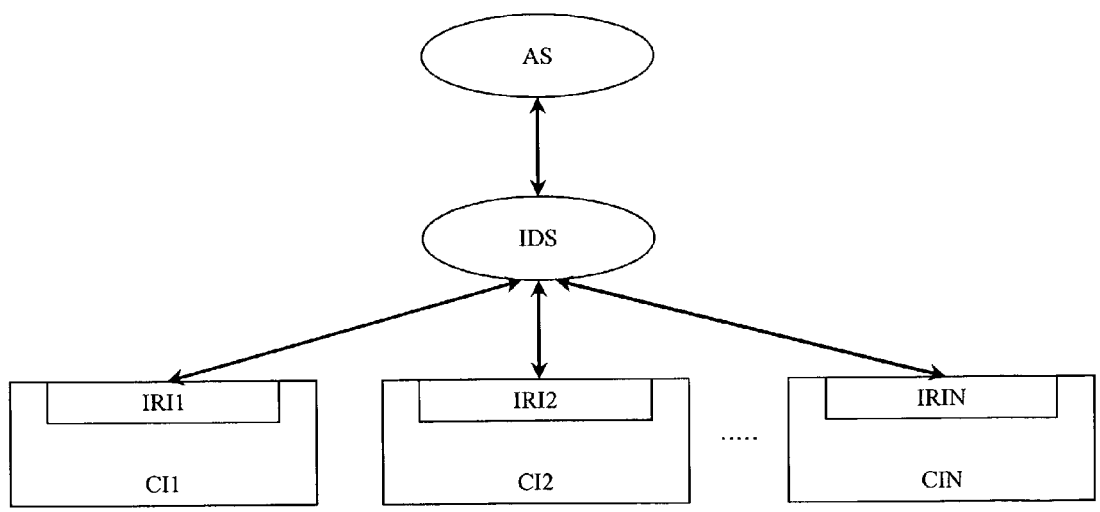
FIG. 2 is a schematic diagram of an embodiment of an integrated circuit system according to the invention.

In the integrated circuit system as depicted in FIG. 2 there is only one driver software (IDS) being communication interface independent. This compares to multiple driver software (SDS1, SDS2, SDSN) specific for each communication interface (CI1, CI2, CIN) as shown in FIG. 1 with respect to the prior art.

As shown in FIG. 2 the application software (AS) of the integrated circuit system communicates with the driver software (IDS) in a communication interface independent way.

The driver software (IDS) communicates with external peripherals via one of the available communication interfaces (CI1, CI2, CIN), i.e. communication interface I, II, ... N. Each of the communication interfaces (CI1, CI2, CIN) has a communication interface independent register interface (IRI1, IRI2, IRIN). To realize such communication interface independent register interfaces (IRI1, IRI2, IRIN) the corresponding registers are grouped into register functionalities common to all communication interfaces, such as general status, control register and/or data register functionalities. The grouping of the registers can be done by means of using the same addresses for the corresponding functionalities irrespective of the selected communication interface (CI1, CI2, CIN). In addition the system can comprise communication interface specific registers, e.g. for initialisation and/or error handling software functions.

In operation the driver software (IDS) communicates with the communication interface independent register interface (IRI1, IRI2, IRIN) in a generic way irrespective of the choice of one of the available communication interfaces (CI1, CI2, CIN).

Figure 3:
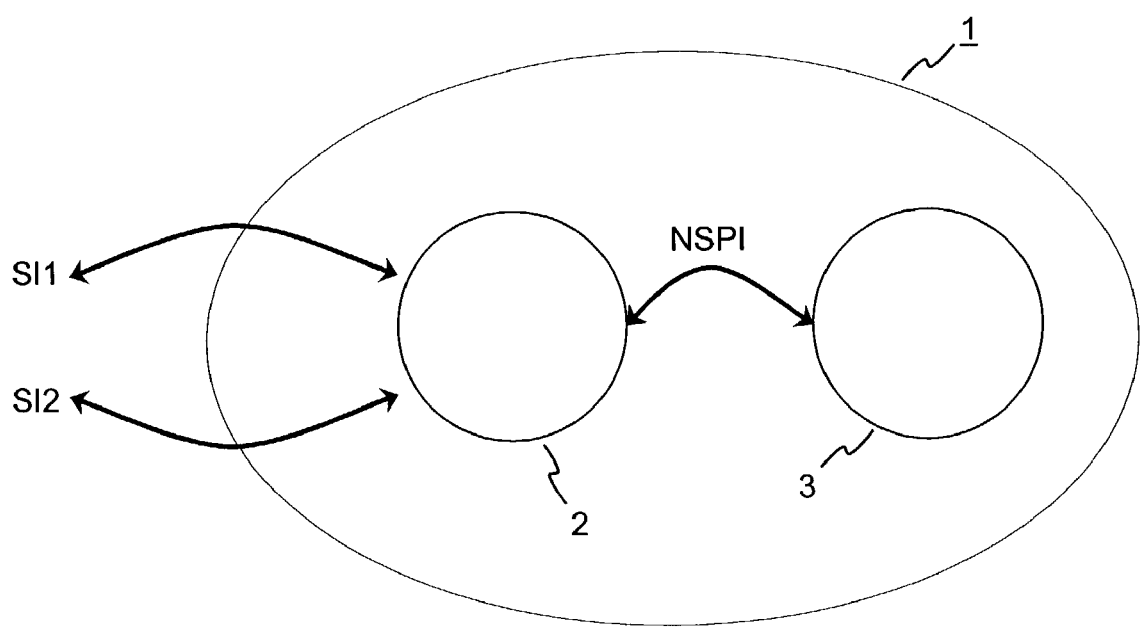
FIG. 3 is illustrative of an exemplary application of the present invention.

In the example of FIG. 3 an embodiment of an integrated circuit (1) in accordance with the invention is shown schematically. The integrated circuit (1) is a so called system on chip comprising a primary processing unit (2) and a secondary processing unit (3). The primary processing unit (2) and the secondary processing unit (3) communicate via a non-standardised parallel interface (NSPI) on chip.

The primary processing unit (2) can communicate with external devices by means of a variety of communication interfaces such as a synchronous, byte-oriented serial interface (SI1), for example the I²C, and an asynchronous, block-oriented serial interface (SI2), using for example the universal asynchronous receive transmit (UART) protocol. This communication is performed by using a generic driver software which is communication interface independent and which communicates with communication interface independent register interfaces to exchange data independently of the selected communication interface.

What is claimed is:

1. An integrated circuit comprising a primary processing unit and at least a first and a second communication interface for the primary processing unit for communicating in accordance with at least a first communication protocol and a second communication protocol different from said first communication protocol, wherein each communication interface includes a set of registers which are arranged such that a specific register functionality is accessible independently of a selection of the first or the second communication interface.

2. The integrated circuit of claim 1, characterized in that the registers having the same register functionality for the first and the second communication interface are located at the same address such that the corresponding functionality is invoked by using that address irrespective of the selection of the first or the second communication interface.

3. The integrated circuit of claim 2, wherein the contents within the registers having the same functionality for the first and the second communication interface are located at the same location within the registers.

4. The integrated circuit of claim 3, wherein the register functionalities comprise general status register functions, control register functions and/or data register functions.

5. The integrated circuit of claim 4, wherein the integrated circuit has a communication interface independent driver software for usage with at least the first and second communication interfaces.

6. The integrated circuit of claim 5, further comprising communication interface specific registers for communication interface specific initialisation and error status purposes.

7. The integrated circuit of claim 4, further comprising communication interface specific registers for communication interface specific initialisation and error status purposes.

8. The integrated circuit of claim 1, wherein the register functionalities comprise general status register functions, control register functions and/or data register functions.

9. The integrated circuit of claim 1, wherein the integrated circuit has a communication interface independent driver software for usage with at least the first and second communication interfaces.

10. The integrated circuit of claim 1, further comprising communication interface specific registers for communication interface specific initialisation and error status purposes.

11. Method for communicating data between a primary processing unit and at least a first and a second external peripheral via at least a first and a second communication interface with at least a first and a second communication protocol, a set of registers of each communication interface being arranged such that a specific register functionality is accessible independently of a selection of the first or the second communication interface, the method comprising the steps of associating each communication interface with an abstract identifier and a data structure index, determining with which external peripheral data is to be exchanged, identifying the first communication interface if data is to be exchanged with the first external peripheral, and identifying the second communication interface if data is to be exchanged with the second external peripheral, initialising the determined external peripheral via communication interface specific registers of the identified communication interface, exchanging data and general status and control information with the determined external peripheral via the communication interface independent set of registers of the identified communication interface, and controlling an error status of the determined external peripheral via communication interface specific registers of the identified communication interface.

* * * * *